Oct. 16, 1962     F. S. METCALFE     3,058,279
FILTER RETAINING STRUCTURE
Filed Dec. 28, 1960
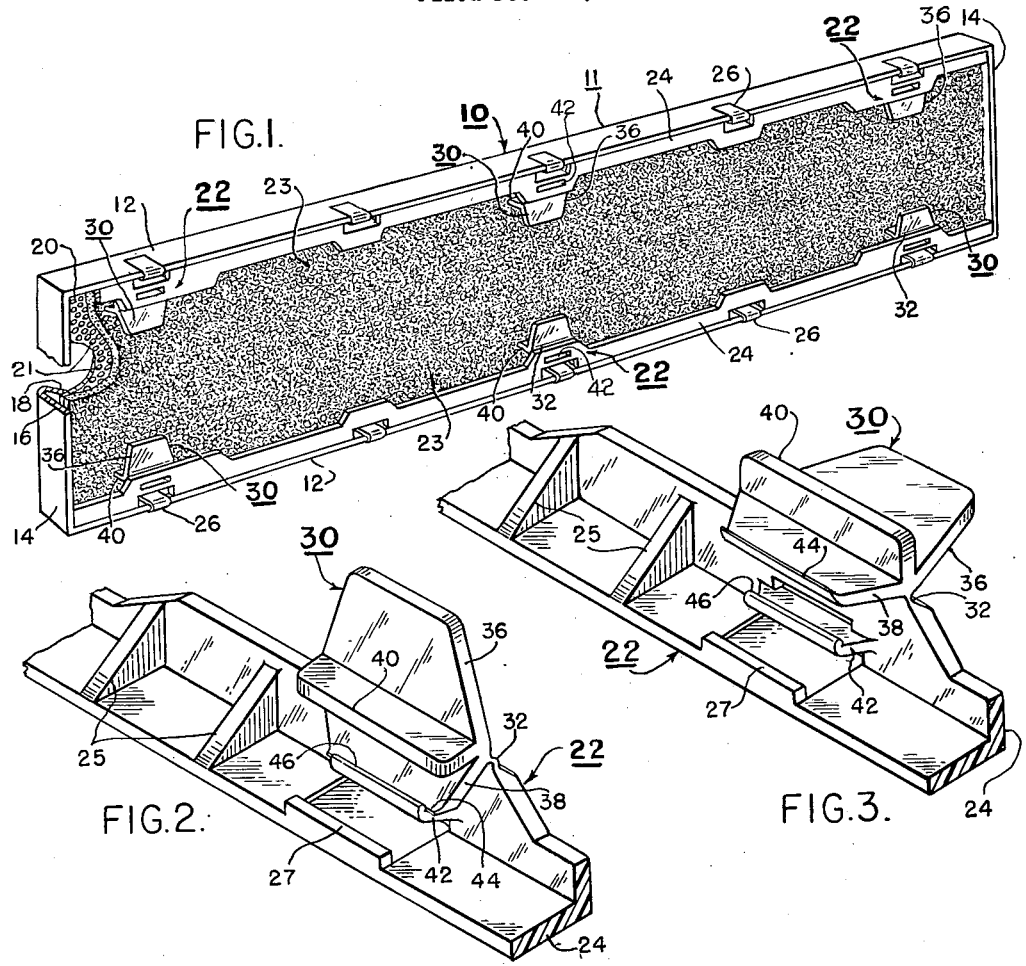
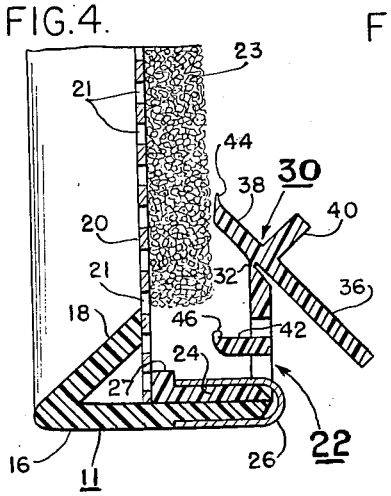
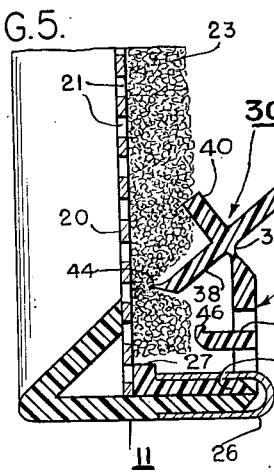
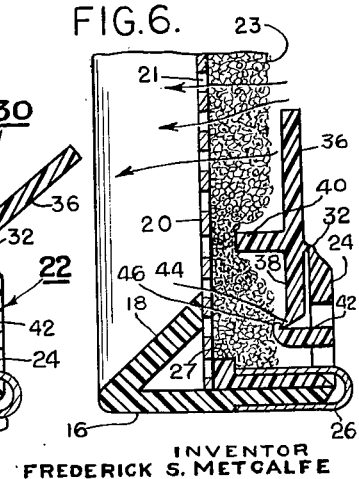
INVENTOR
FREDERICK S. METCALFE
BY Edward A. Sager
ATTORNEY United States Patent Office 3,058,279
Patented Oct. 16, 1962

3,058,279
FILTER RETAINING STRUCTURE
Frederick S. Metcalfe, Columbus, Ohio, assignor to Westinghouse Electric Corporation, East Pittsburgh, Pa., a corporation of Pennsylvania
Filed Dec. 28, 1960, Ser. No. 78,983
3 Claims. (Cl. 55—495)

This invention relates to filter structures, especially the type which employs a replaceable filter body for removing particles of foreign matter from air or other fluid flowing therethrough.

A number of air filters are in common use. These are employed in air conditioners, furnaces, air purifiers, and the like; and they usually comprise a grille and a filter body carried by the grille. Since it is desirable to employ a cleanable and reusable filter body, it is preferred that the frame be equipped so that the filter body can be conveniently and securely positioned, readily removed for cleaning, and easily returned to secured position; and this is the principal object of the present invention.

Filter structures constructed according to the invention comprise a grille, a body of filter material, and an element for removably securing the filter body to the grille. The grille includes a perforated sheet of rigid construction and a frame for carrying the perforated sheet and which extends along the edges of the latter. The securing element includes a base member, a portion of which is connected to the frame, and another portion of which is spaced from the perforated sheet so as to receive a margin of the filter body therebetween. Preferably, the base member is of L-shaped cross section and it defines with the grille a channel for the reception of a marginal edge of the filter body. The securing element further includes a clamping member and also a web integrally connecting the clamping member to the base member. The web is of substantially less cross-sectional thickness than the base member and the clamping member, and it provides a hinged connection between them. The clamping member is movable into compressing engagement with the filter body so as to hold it against the perforated sheet; and it is movable out of compressing engagement therewith to release the filter body. Further provided is means for locking the clamping member in position when it is holding the filter body against the perforated sheet.

The securing element is made as a unit from polypropylene or like material, such material having the ability to withstand numerous flexings without damage; and, hence, when it is employed to provide a hinge connection it can be formed as a unit with its associated parts.

It is preferred that the locking means for the securing element comprise interlocking formations on the base member and the clamping member; and the formation on either the base member or the clamping member, or both, is deflectible so that the formations are disengageable when the base member and the clamping member are moved apart from locked position.

In the illustrated embodiment of the invention, the clamping member includes a first finger provided with one of the aforesaid formations of the locking means, and which is further employed to urge the filter body into position in the channel, and the clamping member further includes a second finger which holds the filter body in position when the securing element is in locked position.

The securing element can be employed in a dual capacity, not only to hold the filter body in place, but also to hold the perforated sheet in place by employing its base member to clamp a marginal edge portion of the perforated sheet against an inturned flange of the frame.

Various other objects, features and advantages of the invention will be apparent from the following description and claims taken in connection with the accompanying drawing, forming a part of this application, in which:

FIG. 1 is a perspective view of filter apparatus embodying the invention, with portions broken away in order to show the grille in detail;

FIG. 2 is a fragmentary perspective view showing one securing element in locked position;

FIG. 3 is a view similar to FIG. 2 but showing the securing element in unlocked position;

FIG. 4 is a vertical sectional view of the filter apparatus of FIG. 1, showing the securing element out of engagement with the filter body;

FIG. 5 is a view similar to FIG. 4, but showing the clamping member of the securing element in a position in which one finger thereof is urging the filter body into the channel; and FIG. 6 is another view similar to FIG. 4, but showing the securing element in locked position, in which position another finger is holding the filter body against the perforated sheet.

As illustrated in the drawing, the invention is embodied in filter structure for domestic air conditioners; however, it is not so limited. The filter structure comprises a grille 10 including a frame 11 having two horizontal legs 12 and two upright legs 14 joined together in rectangular formation. The legs 12 and 14 of the frame 11 preferably comprise a flat border flange construction 16 and an inturned, or inwardly extending, wall 18.

Carried by the frame 11 is a rigid foraminous member or perforated sheet 20, with the legs 12 and 14 extending along the marginal edges thereof. The sheet 20 can be a rectangular sheet of expanded metal, or it can be otherwise formed to have a multiplicity of apertures 21 which permit the passage of fluid, such as air, therethrough. The sheet 20 is of generally flat construction, the marginal portions of one broad surface thereof resting against the free edges of the inturned flange 18 of the frame 11, and the edges of the sheet 20 resting against the inwardly facing surface of the border flange 16.

In association with the respective horizontal frame legs 12 are upper and lower series of securing elements 22 which hold the sheet 20 in position in the frame 11, and which removably secure a body 23 of filter material against the grille 10. The securing elements 22 of each series are connected to each other to form an integral structure, each of which is structurally representative of the other and includes a base member 24 of generally L-shaped cross section, and which is provided with reinforcing ribs 25 for additional rigidity of construction. The base member 24 is secured, as by U-shaped spring clips 26, to the strip 16 of its associated frame leg 12. The perforated sheet 20 is held in position between an upturned toe portion 27 on the foot of the L-shaped base member 24 and the inturned flange 18.

The leg porton of the L-shaped base member 24 extends inwardly of the frame 11, and it is in spaced and generally parallel relation to the sheet 20. Thus, the base member 24 defines with the grille 10 a channel for receiving a marginal edge portion of the filter body 23.

The filter body 23 can be made of any material suitable for filtering foreign particles from gas flowing therethrough. Preferably, however, it is a resilient sheet or mat having the same edge configuration as the perforated sheet 20; and it is preferably made of open cell cellular plastic material having polymeric and reticularly intersticial physical structure, such as polyurethane plastic material. This kind of filter material can be produced in soft and compressible form so that, after its cells become clogged with dust or the like, it may be effectively cleaned by washing it and squeezing it dry.

Each securing element 22 includes a clamping member or locking lever 30 which is hingeably connected to the base member 24 by a web or membrane 32. The cross-sectional dimensions of the web 32 can be in the order of .007 inch thick and .020 inch wide, the thickness of the web being substantially less than the thicknesses of the more rigidly constructed base member 24 and locking lever 30. The securing element 22 is formed as a unit of polypropylene or similar material, as by molding, web sections of such material being capable of flexing numerous times without damage and without loss of flexibility.

The locking lever 30 comprises an operating arm or handle 36, a latch 38, and a clamping arm 40. The operating arm 36 extends away from the grille 10, and it is accessible to the user in all positions of the locking lever 30 so that it may be moved conveniently. The latch 38 extends toward the grille 10 and it is angularly movable about the web 32 into and out of the channel, through the various positions illustrated in FIGS. 4 to 6. Similarly, the clamping arm 40 is movable with the latch 38; but in the unlocked position of the parts it extends inwardly of the frame 11 at an angle with the latch 38 so as to lag the latter when they are moved toward the channel.

As shown in FIG. 4, a marginal edge of the resilient filter body 23 is positioned at the mouth of the channel and the locking lever 30 is disengaged therefrom. This is the position of these parts when the filter 23 is released for removal from the grille 10, and it is also the initial position of the parts when the filter is to be secured in the grille. FIG. 4 also illustrates one extreme position of the locking lever.

Counterclockwise movement of the locking lever 30 from the position of FIG. 4 in the drawing to the position of FIG. 5 brings the latch 38 first into engagement with the filter body 23 and then urges it downwardly into the channel. Continued movement of the locking lever 30, from the position of FIG. 5 to the position of FIG. 6, disengages the latch 38 from the filter body 23 and engages the latch 38 with a catch or keeper 42 formed on the base member 24; and, in the same motion of the locking lever 30, the clamping arm 40 is moved into compressive engagement with the filter body 23 so as to hold it securely against the sheet 20.

In FIG. 6, the filter body 23 is shown in operating position, arrows being employed in this view to show the preferred direction of air movement. In this position the locking lever 30 is in locked position, the latch 38 and the keeper 42 being provided with interlocking formations which assist in holding these parts in locked position. The interlocking formations of the latch 38 and the keeper 42 are in the form of small protuberances of relatively thin section on their respective free edges. The thin cross section of each, or at least one, of the protuberances 44 and 46 renders them deflectible and, therefore, readily disengageable when the latch 38 is moved clockwise and outwardly of the channel; and, during this movement, the clamping arm 40 releases the filter body 23.

From the foregoing it will be appreciated that a unique securing element has been provided which not only is rugged and dependable but which is attractively simple and economical to manufacture. When embodied in filter structure, as for air conditioners, it can be employed to hold a filter body in position in a grille, and also to hold a perforated plate of the grille securely in its frame.

While the invention has been shown in but one form, it will be obvious to those skilled in the art that it is not so limited, but is susceptible of various changes and modifications without departing from the spirit thereof.

What is claimed is:
1. In a fluid filter construction,
a grille comprising
a rigid foraminous member and
a surrounding frame,
a body of resilient filter material abutting said foraminous member within the space defined by said frame, and
means for releasably securing said filter body against said foraminous member, said securing means including
a unitary plastic member comprising;
a base secured to the frame and having
a portion overlapping an edge portion of the filter body,
a locking lever pivotally joined to the edge of said overlapping portion by an integral flexible web constituting a hinge, said base including
a keeper and said locking lever including
an operating arm for manipulation of the lever between a filter securing position and a filter releasing position,
a clamping arm for securing said filter body against the foraminous member when the lever is in filter securing position, and
a latch releasably held by the keeper for releasably retaining the lever in filter locking position.

2. In a fluid filter construction,
a grille comprising
a flat rigid foraminous member and
a surrounding frame, said frame including
a peripheral flange structure,
a body of resilient filter material abutting said foraminous member within the space defined by said flange structure, and
means for releasably securing said filter body against said foraminous member, said securing means including
a unitary plastic member comprising;
a base secured to the frame flange structure and having
a portion overlapping an edge portion of the filter body, and
a locking lever pivotally joined to the edge of said overlapping portion by
an integral flexible web constituting a hinge, said locking lever including;
an operating arm for manipulation of the lever between a filter-securing position and a filter-releasing position,
a clamping arm for securing said filter body 25 against the foraminous member when the lever is in filter-securing position, and
means for releasably retaining the lever in filter-locking position.

3. In a fluid filter construction,
a grille comprising
a flat rigid foraminous member and
a surrounding frame, said frame including peripheral flange structure lying in planes generally perpendicular to the plane of said foraminous member,
a body of resilient filter material abutting said foraminous member within the space defined by said flange structure, and
means for releasably securing said filter body against said foraminous member, said securing means including
a unitary plastic member comprising;
a base L-shaped in cross section with its foot secured to the frame flange structure and its leg overlapping an edge portion of the filter body, and
a locking lever pivotally joined to the free edge of the base leg by an integral flexible web constituting a hinge, said locking lever including;

an operating arm for manipulation of the lever between a filter-securing position and a filter-releasing position, a clamping arm for securing said filter body against the foraminous member when the lever is in filter-securing position, and a latching arm for releasably retaining the lever in filter-locking position.

References Cited in the file of this patent

UNITED STATES PATENTS

| | | |
|---|---|---|
| 1,104,151 | Stein | July 21, 1914 |
| 2,709,489 | Keebler | May 31, 1955 |
| 2,754,928 | Hambrecht et al. | July 17, 1956 |
| 2,973,831 | Sprouse et al. | Mar. 7, 1961 |
| 2,981,367 | Sprouse | Apr. 25, 1961 |